(12) United States Patent
Kemp et al.

(10) Patent No.: US 7,503,681 B2
(45) Date of Patent: Mar. 17, 2009

(54) OPTICAL FIBER COMBINATIONS

(76) Inventors: Gary Kemp, P.O. Box 2480, Cherry Hill, NJ (US) 08034; Andrew N. Lodge, P.O. Box 2480, Cherry Hill, NJ (US) 08034; Thomas R. Lodge, Jr., P.O. Box 2480, Cherry Hill, NJ (US) 08034

( * ) Notice: Subject to any disclaimer, the term of this patent is extended or adjusted under 35 U.S.C. 154(b) by 0 days.

(21) Appl. No.: 11/975,303

(22) Filed: Oct. 18, 2007

(65) Prior Publication Data

US 2008/0074897 A1 Mar. 27, 2008

Related U.S. Application Data

(63) Continuation-in-part of application No. 11/526,913, filed on Sep. 26, 2006, now abandoned.

(51) Int. Cl.
*F21S 4/00* (2006.01)
(52) U.S. Cl. ............... 362/565; 362/96; 362/253; 362/556; 244/33; 446/219; 446/220

(58) Field of Classification Search ............... 362/96, 362/234, 253, 551, 554, 556, 565; 40/214, 40/547; 116/210; 244/33; 446/219–226
See application file for complete search history.

(56) References Cited

U.S. PATENT DOCUMENTS

| 6,371,638 B1 * | 4/2002 | Zingale et al. ............... 362/565 |
| 7,073,932 B2 * | 7/2006 | Wainwright ............... 362/565 |

* cited by examiner

*Primary Examiner*—Stephen F Husar
(74) *Attorney, Agent, or Firm*—Zachary T. Wobensmith, III

(57) ABSTRACT

Optical fiber combinations, connected to a lighter than air balloon, which includes a tether having one or more lengths of optical fibers, and can include a string, which optical fibers have an outer protective jacket or cladding to prevent light from escaping therefrom, with portions of the jacket or cladding removed at selected locations along their lengths to permit light patterns to be emitted therefrom, upon shining of a light source into the ends of the fibers.

2 Claims, 2 Drawing Sheets

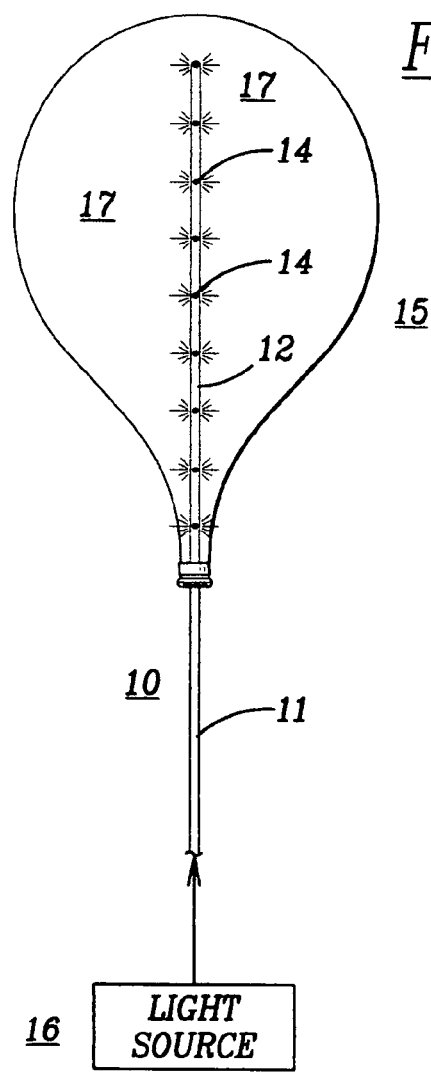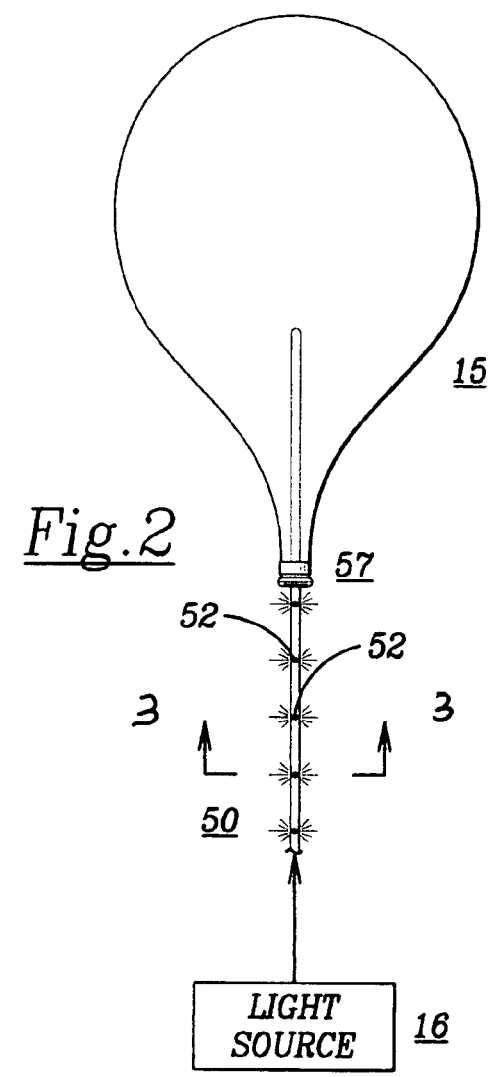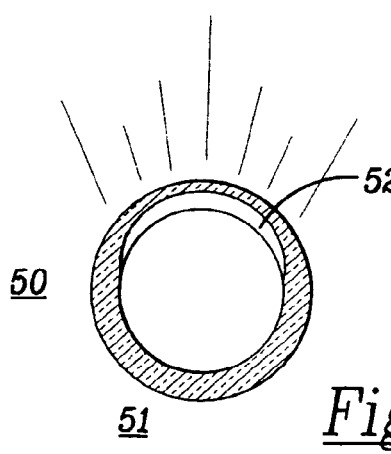

OPTICAL FIBER COMBINATIONS

CROSS REFERENCE TO RELATED APPLICATIONS

This application is a Continuation-in-Part of our prior application Ser. No. 11/526,913, filed Sep. 26, 2006, entitled Fiber Optic Cable Combinations, now abandoned.

BACKGROUND OF THE INVENTION

1. Field of the Invention

This invention relates to optical fiber combinations, for connection to a lighter than air balloon, which include a tether formed of one or more lengths of optical fibers, which tether can include a string, the lengths of fibers having jackets or cladding with portions removed at selected locations along their lengths, to allow light to escape and provide light patterns to, in, and around the balloon.

2. Description of the Prior Art

Optical fibers are well known and used for transmitting light from a light source to the desired illumination point.

It is known to provide sidelight-emitting fibers, with the fibers being partially translucent along their lengths. U.S. Pat. No. 6,371,638 pertains to lighter than air balloons which are decorated with illuminated optical fibers. U.S. Pat. No. 5,857,760 discloses an optical fiber illuminated balloon. U.S. Pat. No. 6,106,135 shows an illuminated balloon. None of the prior art discloses a lighter than air balloon, which has a tether connected thereto containing one or more optical fibers, which fibers allow only minimal incidental light escape up to the balloon, with portions of the fiber jacket or cladding removed inside the balloon, providing light patterns inside the balloon, or have portions removed to provide light patterns up to the balloon, and opaque inside the balloon, or which fibers can have portions removed to provide light patterns along their lengths, both outside and inside of the balloon, the optical fibers being connected to a light source.

SUMMARY OF THE INVENTION

This invention is directed to optical fiber combinations connected to a lighter than air balloon, which include a tether having one or more lengths of optical fibers, and can include a string, which fibers include an outer protective jacket or cladding to prevent light escaping therefrom, with portions removed at selected locations along their lengths to provide light patterns inside and/or outside of the balloon.

The principal object of the invention is to provide optical fiber combinations connected to a balloon, which include a tether having one or more lengths of optical fibers, and can include a string, which fibers have portions of their jackets or cladding removed at selected locations along their lengths to provide light patterns to, in, or around the balloon.

A further object of the invention is to provide optical fiber combinations, which can provide a large variety of light patterns.

A further object of the invention is to provide optical fiber combinations that can illuminate the interior of a balloon, and/or provide light patterns up and/or around the balloon.

A further object of the invention is to provide optical fiber combinations, which can be used for a variety of illuminating and decorating purposes.

A further object of the invention is to provide optical fiber combinations which are easy to manufacture, and suitable for mass production.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a side elevational view of one embodiment of optical fiber combination connected to a lighter than air balloon.

FIG. 2 is a view similar to FIG. 1 of another embodiment of the invention.

FIG. 3 is a horizontal sectional view taken approximately on the line 3-3 of FIG. 2.

Figure 4:
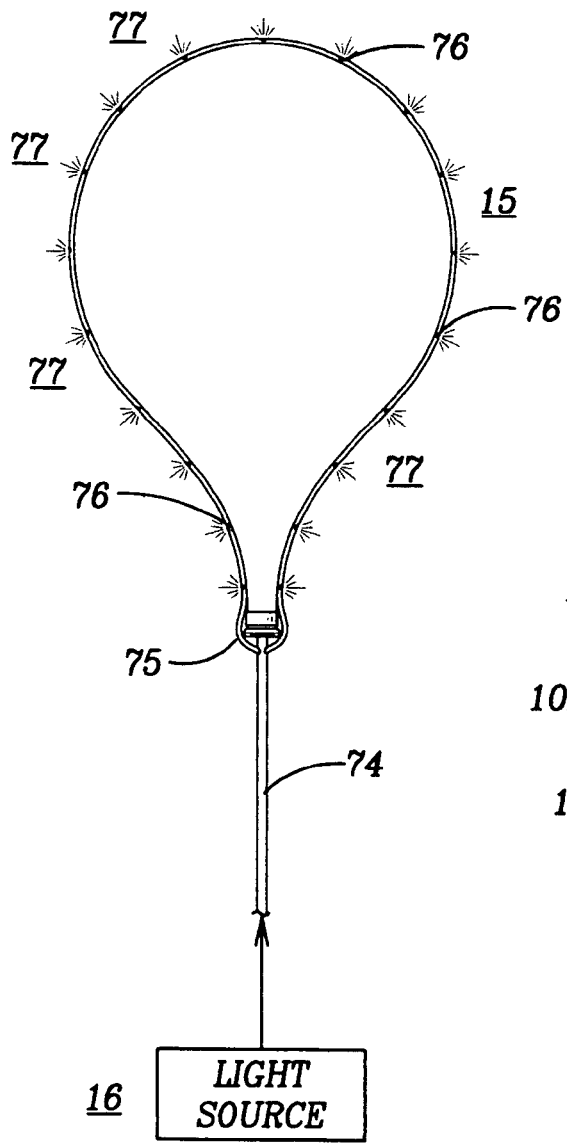
FIG. 4 is a view similar to FIG. 1 of another embodiment of the invention.

It should, of course, be understood that the description and drawings herein are merely illustrative, and that various modifications and changes can be made in the structures disclosed without departing from the spirit of the invention.

Like numerals refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Referring now more particularly to the drawings and FIG. 1 thereof, a tether 10 is therein illustrated, which tether is comprised of one or more lengths of optical fibers 11 of well-known type, one being shown, which are readily available from a variety of manufacturers, and which tether 10 can also include a string (not shown). The fiber 11 as shown has an outer protective jacket or cladding 12 along its length, to prevent light from being transmitted to other than the end of the cable 11, which jacket or cladding 12 allows minimal incidental escape of the light transmitted therein. Portions of the jacket or cladding 12 are removed at selected locations 14 along its length to permit light to be emitted therefrom. The locations 14 can be configured to provide a variety of patterns 17, such as stars, circles, squares or any other desired pattern (not shown).

The tether 10 is connected to a lighter than air balloon 15, of well-known type and which can be of Mylar or other material, and can be opaque or translucent. The balloon 15 as illustrated, has been filled with a lighter than air gas, such as helium. In the embodiment of FIG. 1, the light emitting locations 14 of the fibers 11 are inside the balloon 15, and the fibers 11 allow only minimal incidental light escape up to the balloon 15. The fibers 11 have a light source 16 of well-known type connected thereto, which shines light into the ends of fibers 11, with the light patterns 17 being emitted therefrom inside of the balloon 15.

Referring now to FIGS. 2 and 3, another embodiment of tether 50 is shown with one or more lengths of optical fibers 51, one being shown, which has an outer jacket or cladding 53, and at selected locations 52 along its length provides light patterns 57 up to the balloon 15. The fiber 51 allows only minimal incidental light escape inside of the balloon 15, or which balloon 15 itself can be opaque. The locations 52 permit light patterns 57 to be emitted therefrom, and with a variety of light patterns 57 available as described for fiber 11. The fibers 51 have a light source 16 connected thereto, which shines light into the ends of fibers 51, to provide the light patterns 57 at the locations 52.

Referring now to FIG. 4, another embodiment of optical fiber combination is therein illustrated, which includes a balloon 15, with a tether 74, which has at least one optical fiber 75, similar to fiber 11, which is engaged with the balloon's perimeter, which fiber 75 has an outer jacket or cladding (not shown), with portions removed at locations 76 along its length, similar to fibers 11, and with a light source 16 shining light into the end of fiber 75, providing light patterns 77, at the selected locations 76.

Figure 5:
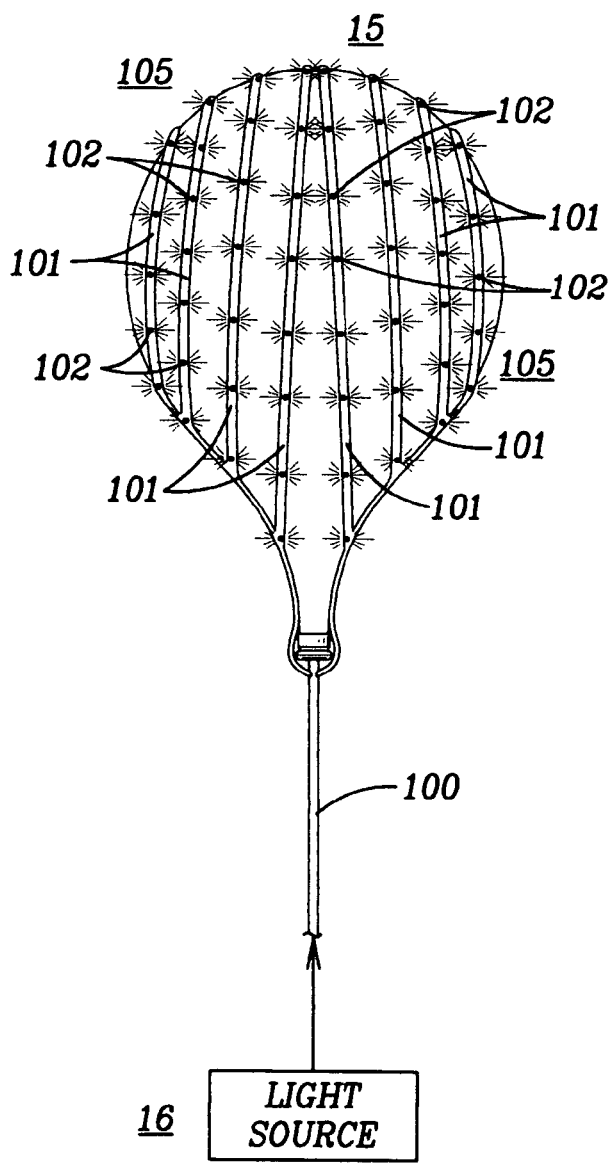
FIG. 5 is a view similar to FIG. I of another embodiment of the invention.

Referring now to FIG. 5, another embodiment of optical fiber combination is therein illustrated, which includes a balloon 15, with a tether 100, which includes a plurality of lengths of optical fibers 101, similar to fiber 11, with outer jackets or cladding (not shown), which allow only minimal light to escape, with portions removed at selected locations 102 along their lengths, to provide light patterns 105 to be emitted therefrom. The fibers 101 surround and encapsulate the balloon 15. The fibers 101 are carried inside an outer jacket 103 which surrounds them, The fibers 101 have a light source 102 shining light into their ends, providing the desired light patterns 105, at the selected locations 102.

It will thus be seen that optical fiber combinations have been provided with which the objects of the invention are achieved.

We claim:

1. Optical fiber combinations for use with a lighter than air balloon comprising,
    a tether attached to said balloon,
    said tether including one or more lengths of optical fibers,
    each of said fibers having an outer protective jacket or cladding, to prevent light from escaping therefrom, portions of said fiber jackets are removed at selected locations to permit light to be emitted therefrom, which locations are external to said balloon, and
    a light source to provide light to said optical fibers.

2. Optical fiber combinations for use with a lighter than air balloon comprising,
    a tether attached to said balloon,
    said tether including a plurality of lengths of optical fibers, which surround and encapsulate said balloon, each of said fibers having an outer protective jacket or cladding, to prevent light from escaping therefrom,
    portions of said fiber jacket or cladding are removed at selected locations along their lengths to permit light to be emitted therefrom, and a light source to provide light to said optical fibers.

* * * * *